United States Patent [19]

Short

[11] 3,956,816

[45] May 18, 1976

[54] METHOD OF TRANSPORTING AND CONSTRUCTING TANKS

[75] Inventor: Robert J. Short, Laguna Beach, Calif.

[73] Assignee: Justin Enterprises, Inc., Westminster, Calif.

[22] Filed: Apr. 21, 1975

[21] Appl. No.: 570,227

[52] U.S. Cl. .................. 29/429; 29/446; 52/2; 220/1 B; 214/10.5 R; 214/1 H; 214/152
[51] Int. Cl.² ........................................ B23P 19/00
[58] Field of Search ........... 29/446, 429; 214/1 H, 214/1 MS, 10.5 R, 152; 220/1 B; 52/2

[56] References Cited
UNITED STATES PATENTS

| | | | |
|---|---|---|---|
| 1,087,340 | 2/1914 | Weet | 206/517 |
| 1,872,810 | 8/1932 | Raymond | 29/429 |
| 2,291,755 | 8/1942 | Pierce | 206/517 |
| 2,605,540 | 8/1952 | Krall et al. | 214/1 H UX |
| 2,654,473 | 10/1953 | Pierce | 206/517 |
| 2,708,012 | 10/1955 | Talcott | 214/152 UX |
| 2,841,297 | 7/1958 | Washabaugh | 214/152 X |
| 3,236,020 | 2/1966 | Toffolon | 214/152 X |
| 3,421,644 | 1/1969 | Butcher | 214/152 X |
| 3,470,656 | 10/1969 | Clements | 52/2 |

Primary Examiner—Charlie T. Moon
Attorney, Agent, or Firm—Gausewitz, Carr & Rothenberg

[57] ABSTRACT

This invention provides a method for producing a storage tank from a resilient material, such as a fiber glass reinforced plastic, in which a member is formed to a cylindrical configuration at a first location, flattened to an oblate configuration and held in said oblate configuration while transported to a second location, and then released so as to resume its cylindrical configuration, whereupon by addition of a base and a top the tank is completed. The member may be formed in sections at the first location with the sections being flattened to varying degrees so as to fit one within the other during transportation. Similarly, the top and base may be cut into sections and nested with the sections of the flattened member during transportation.

35 Claims, 16 Drawing Figures

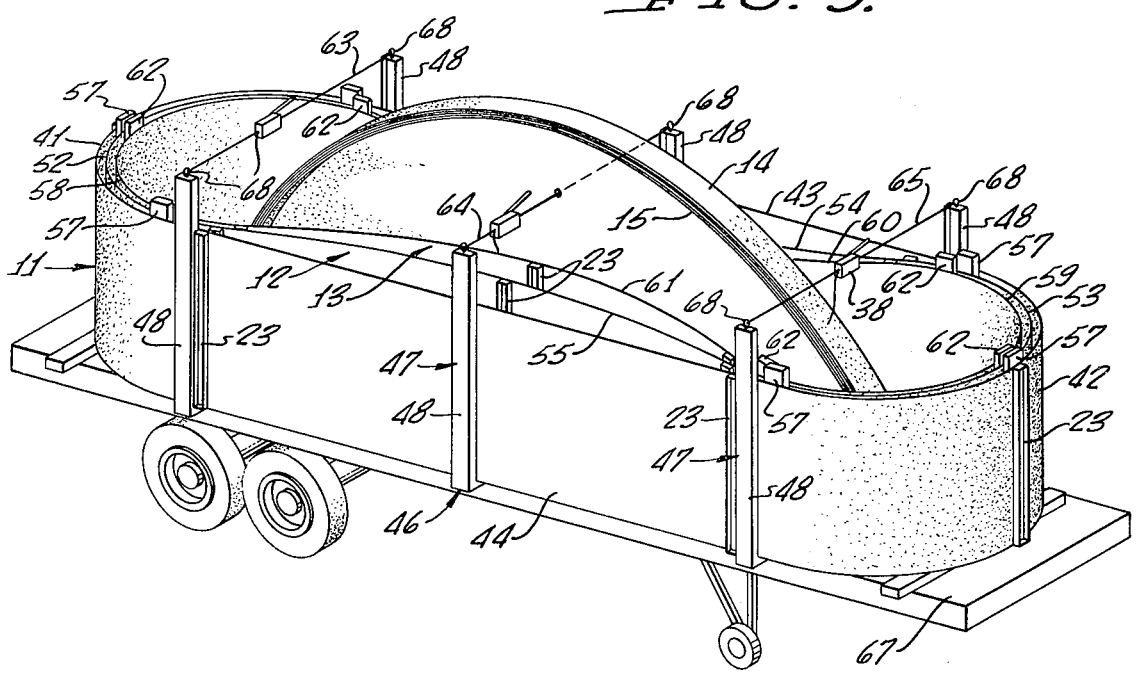
FIG. 9.
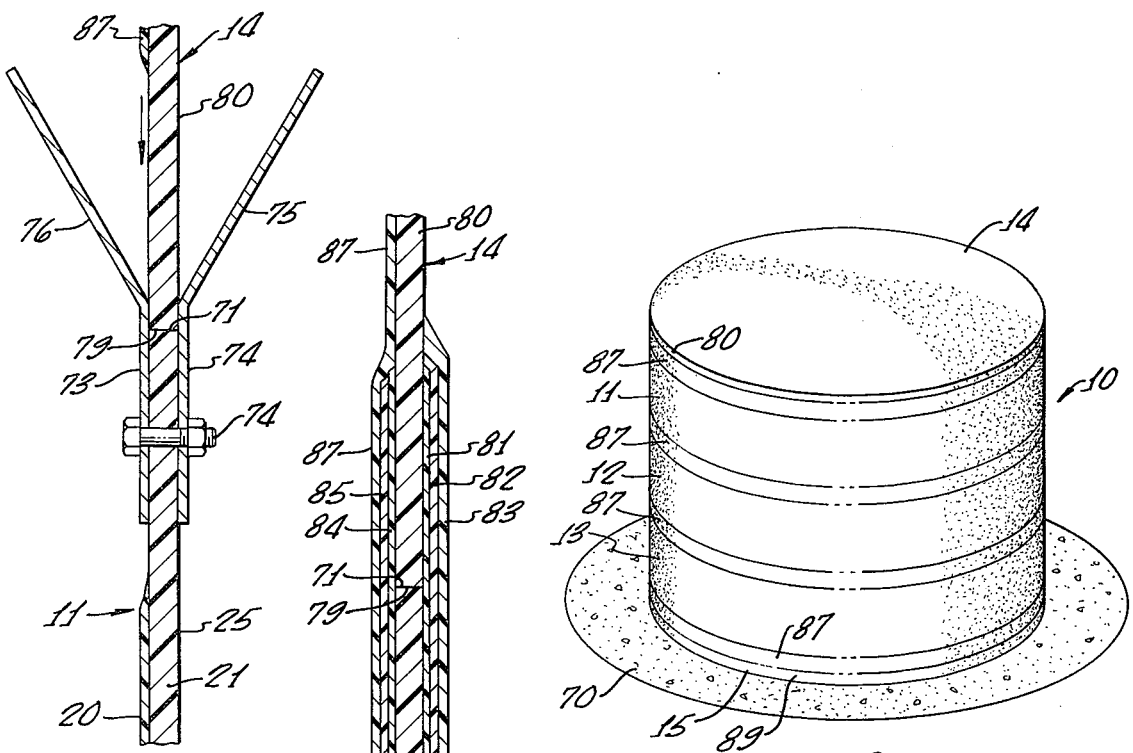
FIG. 15.
FIG. 1.
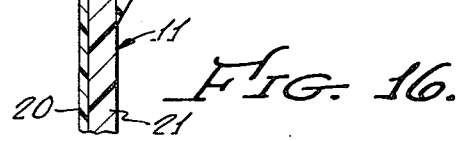
FIG. 16.

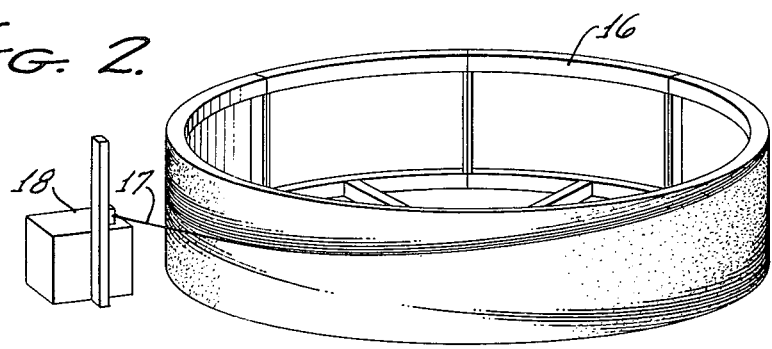
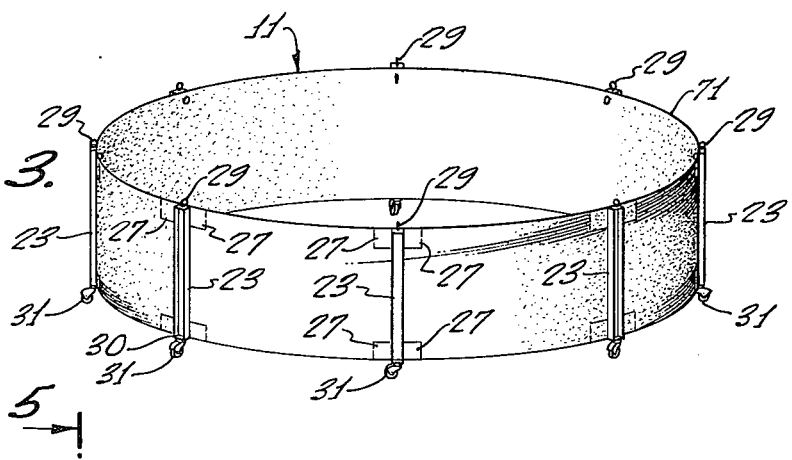
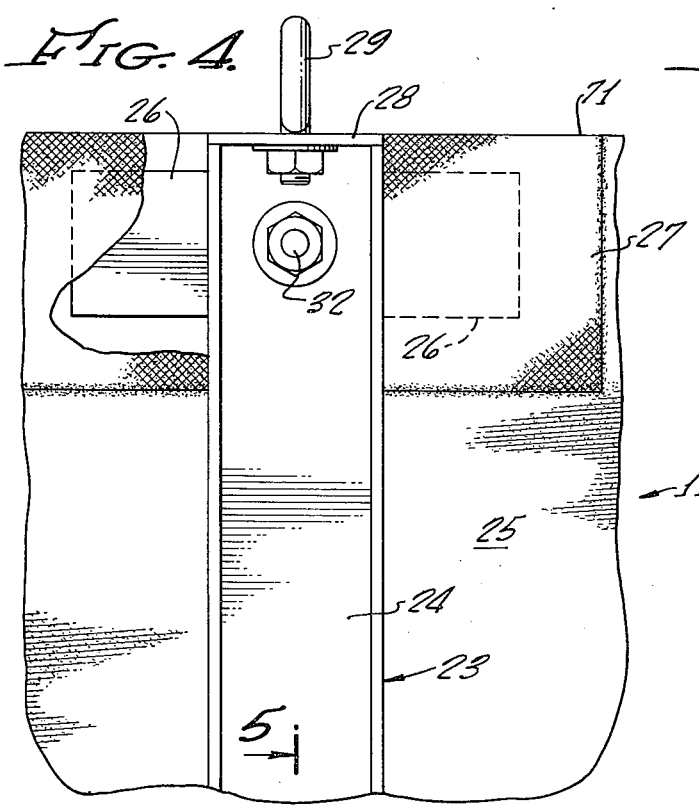
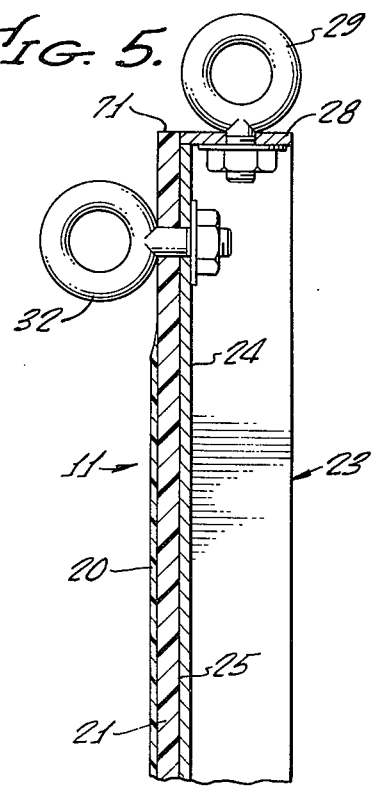

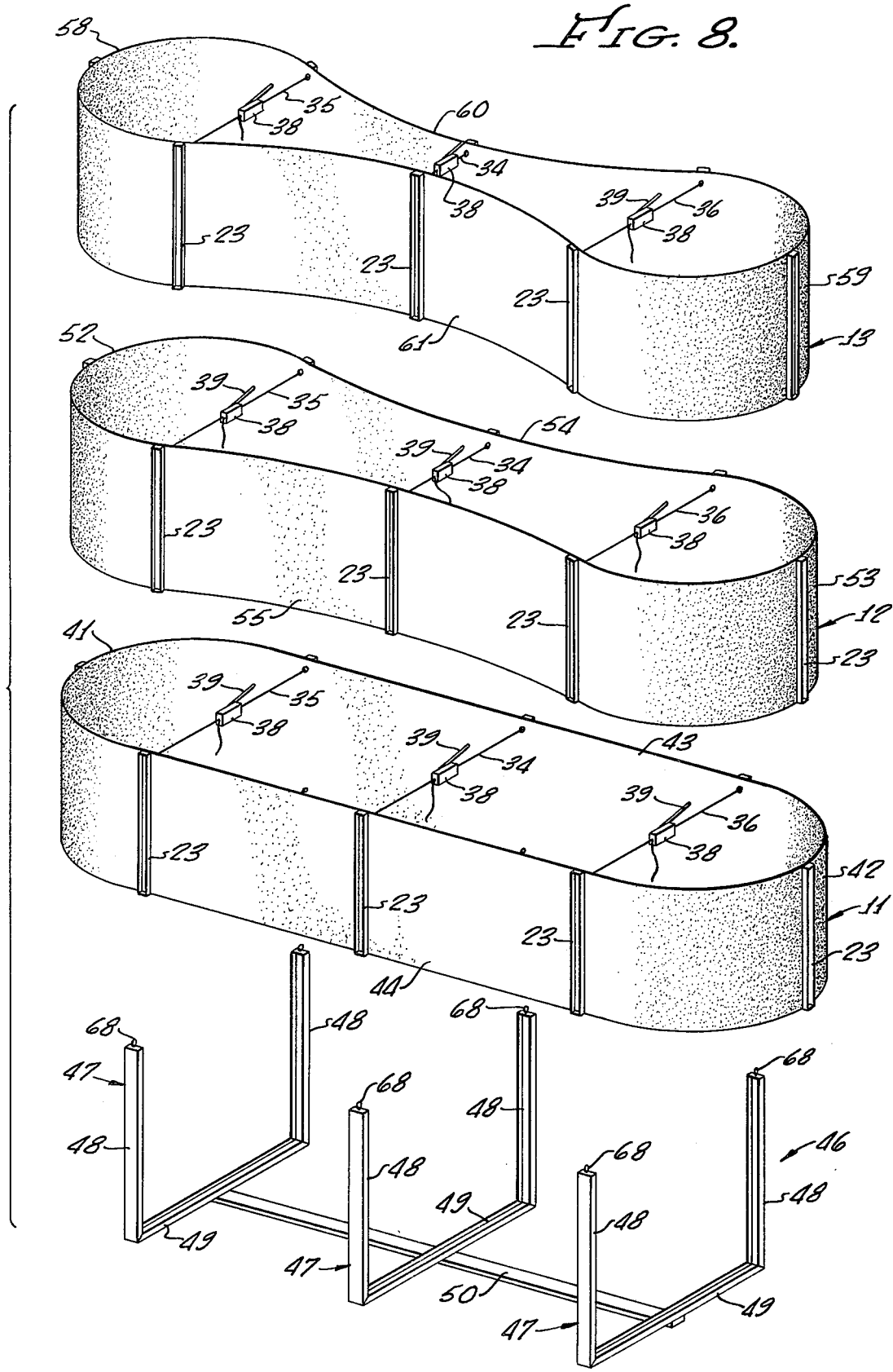

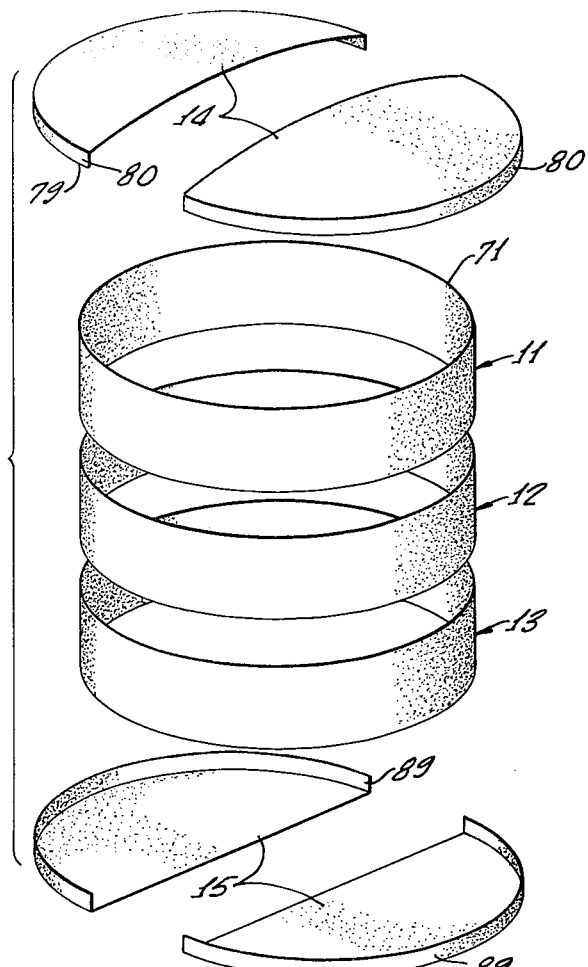
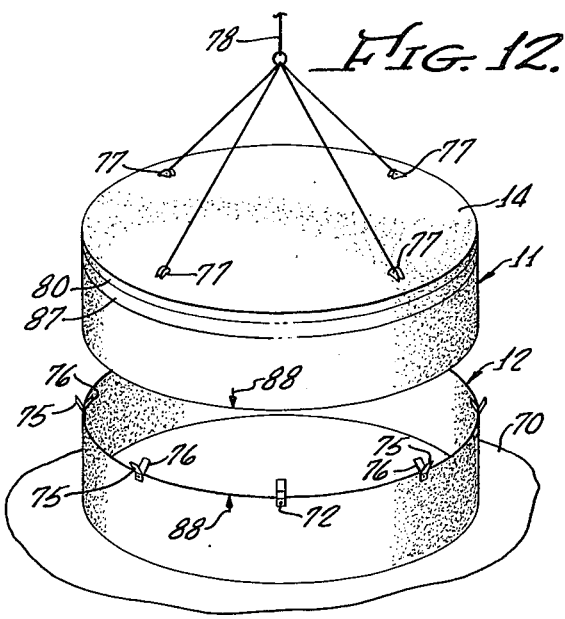
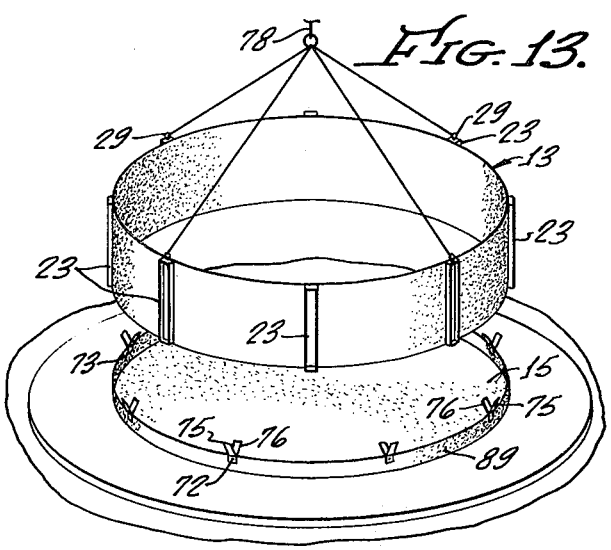
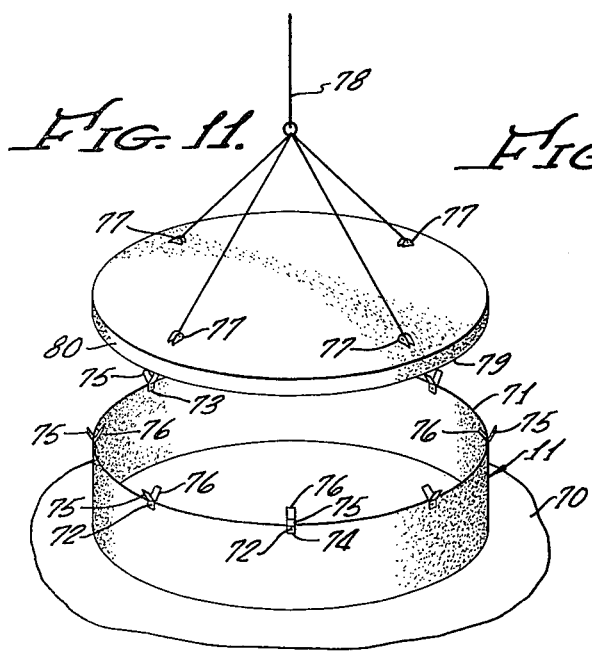

METHOD OF TRANSPORTING AND CONSTRUCTING TANKS

BACKGROUND OF THE INVENTION

1. Field of the Invention

This invention relates to the construction of storage tanks.

2. Description of the Prior Art

Fiber glass reinforced plastic storage tanks offer many advantages over tanks made of other materials which has resulted in an increasing and widespread use of these tanks. With proper selection of material, they are inert chemically so that they can be used for storing chemicals and with any liquid the problem of corrosion is lessened. Furthermore, they are durable and strong. They can be made at relatively low cost, under factory-controlled conditions.

However, such reinforced plastic storage tanks have been limited almost exclusively to tanks of relatively small size. This is because tanks of larger diameters cannot be transported either by truck or rail due to the dimensional limits for loads in such transportation. Larger tanks exceed permissible load widths. Hence, factory production has not been possible. Some larger tanks have been constructed by fabricating the tank on the site of its use so that no transportation is required. There are several drawbacks to such a procedure, principally involving the increased time required for production. A controlled environment is needed for constructing such tanks which cannot be realized even with the use of a temporary air supported structure. Temperatures may fluctuate reducing or extending the cure time of the resin used for the tank as well as making working conditions somewhat unpleasant. Also, a project of this type requires transportation of equipment to the site where the tank is to be produced, which is a relatively expensive operation. Skilled personnel normally must be sent to the place of the tank project to further add to the cost. Inherently it is more difficult to control the manufacturing operation in the field so that on-site tank fabrication requires considerable effort to obtain quality approaching that of factory production. Thus, large tank construction at the site of use of the tank is costly as well as being relatively slow and cumbersome.

SUMMARY OF THE INVENTION

The present invention provides a way in which large-sized, fiber glass reinforced plastic storage tanks may be made in the factory yet transported to the ultimate destination and erected without difficulty. The process of the invention is based around the formation of tank sections in the factory as cylindrical units which are deformed to an oblate configuration, giving them a width such that they will fit on a truck or railroad car and can be moved wherever desired. The tank unit is deformed by using tension elements on the interior of the unit, connected to structural members on the wall of the unit, which are used to draw portions of the wall together. At the destination, the tank sections are released from their restraint and, because the material is resilient, will return exactly to a cylindrical configuration. Typically, there will be three sections of the tank which are fastened together in the field with a relatively simple operation so that with the addition of the top and base the tank is completed. The top and base also are made at the factory and may be shipped with the sections that are used to make up the sidewalls of the tank.

The prepared tank sections can be made particularly compact for shipment by being tensioned different amounts so that they will nest one within the other, being held against returning to a cylindrical shape by means of a framework engaging the outer tank section. The top and bottom may be cut into two or more pieces and fitted within the nested tank sections as the assembly is moved to the desired location.

The result is a construction of the tank under factory-controlled conditions where an adverse environment is not a factor and where permanent equipment may be used to assure optimum construction efficiencies and quality. The assembly of the tank in the field is a relatively simple process requiring little in the way of equipment or skilled personnel. As a result, large plastic tanks of the best quality may be produced at a very low cost, so that an entire new market for such tanks has been opened by the advent of this invention.

BRIEF DESCRIPTION OF THE DRAWINGS

FIG. 1 is a perspective view of a tank produced in accordance with this invention;

FIG. 2 is a perspective view illustrating the formation of a cylindrical module of the tank;

FIG. 3 is perspective view of a completed module;

FIG. 4 is an enlarged fragmentary elevational view of the exterior of the module showing the attachment of a beam thereto;

FIG. 5 is a sectional view taken along line 5—5 of FIG. 4;

FIG. 8 is an exploded perspective view of the various deformed modules and the frame to receive them;

FIG. 9 is a perspective view of the nested modules and tank top and base positioned within the frame and located on a trailer bed;

FIG. 10 is an exploded perspective view of the components of the tank prior to assembly;

FIGS. 11, 12, 13 and 14 are perspective views illustrating four successive steps in the assembly of the tank;

FIG. 15 is an enlarged fragmentary sectional view illustrating the arrangement for guiding the tank components together upon assembly; and FIG. 16 is an enlarged fragmentary sectional view of the joint formed between connected components of the tank.

DESCRIPTION OF THE PREFERRED EMBODIMENT

Figure 6:
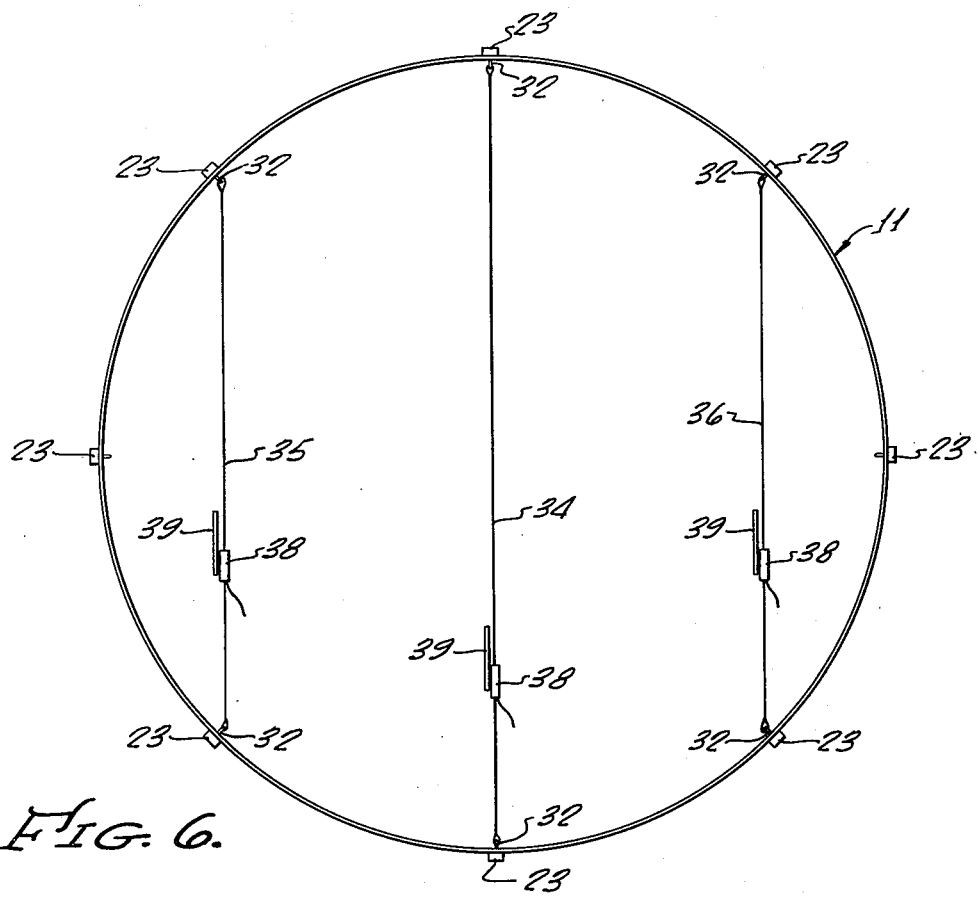
FIG. 6 is a top plan view of a module prepared for being deformed to a flattened shape.

The tank 10, shown in FIG. 1, made in accordance with this invention is a filament wound, fiber glass reinforced plastic storage tank such as may be used for water or chemicals. In typical examples, the tank 10 will have a capacity of 100,000 gallons or more and be from 18 feet to 60 feet in diameter. The tank 10 is assembled on the site of its use from three identical cylindrical modules 11, 12 and 13, together with a top 14 and a bottom 15 which form the ends of the tank.

The modules 11, 12 and 13 are constructed at the factory in the manner indicated in FIG. 2, on a cylindrical drum 16 that serves as the mold. After the application of a surface veil and chopped strand mat to the drum to later serve as a corrosion barrier in the completed tank, a glass fiber roving 17 is fed from a supply source 18 onto the cylindrical drum 16 as it rotates about its axis. The filaments 17 are wound in a predetermined pattern on the drum 19 and are impregnated with plastic to provide a module of high tensile strength. Thermosetting plastics, such as polyester resin, are suitable for the tank construction, with the glass fibers making up around 45% to 50% by weight of the wall that is produced. The filament 17 may be "Fiberglas Type 30" untwisted single end roving with silane sizing, marketed by Owens-Corning Fiberglas Corporation, Toledo, Ohio. The glass fibers 17 are wound over the corrosion barrier 20 (see FIG. 4) which may be of polyester resin, and stops short of the top and bottom ends of the module. The particular resin of the corrosion barrier 20 is selected in view of the nature of the liquid the completed tank is to retain. For a tank 28 feet in diameter, the corrosion barrier 20 suitably may be 0.100 inch thick, with the reinforced laminate 21 being 0.650 inch in thickness for a total wall thickness of 0.750 inch. Although possessing high tensile strength, such a wall also has resilience. It is preferred to make each module 8 feet in length for convenience in manufacture, shipping and subsequent assembly, allowing ground level access to all parts of the module.

After the completion of the cylindrical module, channel beams 23 are attached to its exterior, the channels being parallel to the axis of the module and positioned with their central webs 24 abutting the exterior surface 25 of the module. The channels 23 include laterally projecting tabs 26 welded to their top and bottom ends, projecting outwardly on either side of the channel parallel to the central web 24. Laminations 27 of resin-impregnated glass cloth, which are larger in transverse dimension that the tabs 26, are placed over the tabs 26 and bond them and hence the channels 23 to the exterior of the module. In the embodiment illustrated, there are eight channels 23, equally spaced around the perimeter of the module and extending from one end of the module to the other.

Upper end plates 28 are fastened at the upper end of the channel 23 by welding and receive vertically oriented eyebolts 29. Similar end plates 30 are provided at the bottom of each channel to allow the attachment of caster wheels 31.

The module, with the resin cured, is removed from the drum 19 by engaging the eyebolts 29 at the upper ends of the channels 23, lifting the module off of the drum and setting it to one side. The caster wheels 31 beneath the module facilitate movement of the module prior to the time of its shipment. Upon removal from the drum 19, openings are formed through the inner web 24 of each channel 23 adjacent its top and bottom ends, continuing through the wall of the module, to receive the shanks of eyebolts 32 which extend into the interior of the module.

The top 14 and base 15 for the tank also are factory produced and are made in a conventional manner.

When the modules 11, 12 and 13 are to be shipped to the site for the completed tank they are deformed from their normal cylindrical contour to a flattened shape with a greatly reduced width to allow them to be transported by truck or rail. This may be accomplished by attaching a cable assembly 34 to two diametrically opposed eyebolts 32 at the top of the module and a second cable assembly 34 to the opposed pair of eyebolts 32 immediately below the first. Additional cable assemblies 35 and 36 are attached top and bottom to opposed eyebolts 32 on either side of the cable assemblies 34 so that the cable assemblies 35 and 36 are parallel to the cable assembly 34 and chordal with respect to the module. The cable assemblies 34, 35 and 36 include take-up units 38, each with a lever 39, which allows the effective length of the cable between the eyebolts to be shortened by manipulation of the lever.

Figure 7:
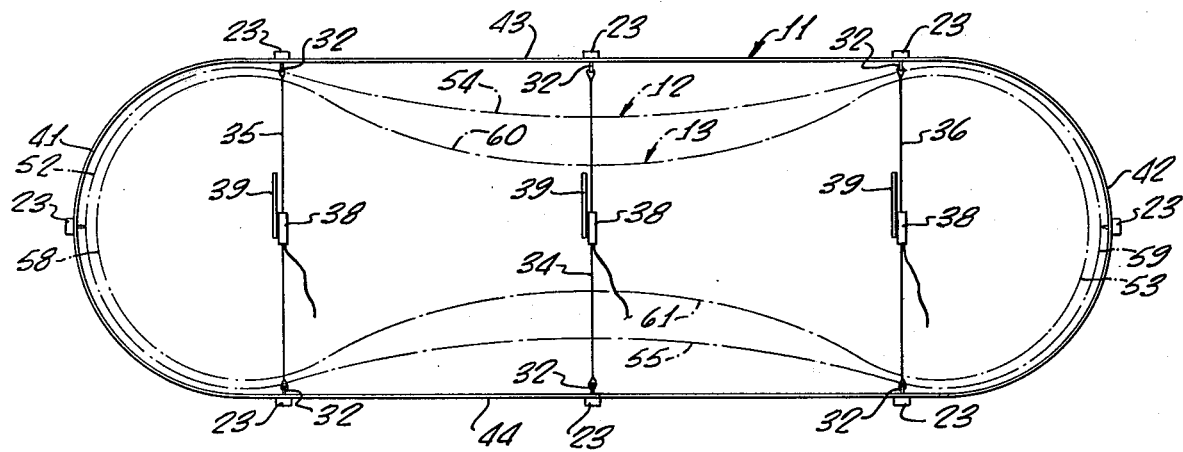
FIG. 7 is a plan view of the module after flattening, with two additional modules shown in phantom as nested within the flattened module.

The take-up units 38 are operated so as to deform the module from its cylindrical shape, as in FIG. 6, to an oblate configuration as shown in FIGS. 7 and 8. This is done by drawing in the wall of the tank by means of the cable assemblies 34, 35 and 36 with the reaction being transmitted to the module wall by the structural channels 23. For shipment by truck or rail the module should be deformed to a maximum width dimension of no greater than 12 feet. For one of the modules, such as the module 11, the deformation is such that the module is given rounded ends 41 and 42 interconnected by substantially straight parallel opposite walls 43 and 44.

This module, so distorted, then is positioned within a frame 46. The latter unit includes three spaced U-shaped structural portions 47, each with parallel straight, vertical side beams 48 and a straight horizontal base beam 49 appropriately made of steel channels. A longitudinally extending interconnecting beam 50 joins the three U-shaped portions 47 of the frame 46. When the module 11 is associated with the frame 46, it rests on the base beams 49 with its flattened sidewalls 43 and 44 received between the upstanding portions 48 of the U-shaped portions 47 of the frame 46 and the ends 41 and 42 extending beyond the frame. The module 11 is flattened to a degree such that its sidewalls 42 and 43 are spaced apart just slightly less then the spacing between the vertical beams 48 of the frame, allowing the module to fit within the frame. The cable assemblies 34, 35 and 36 are removed so that the module 11 expands outwardly against the beams 48 and the frame 46, which act as abutments that exert an exterior force on the module to hold it in its oblate configuration.

The next module, such as the module 12, also is flattened but to a greater degree so that it will fit within the oblate module 11 in the frame 46. Accordingly, the cable assemblies 34, 35 and 36 are contracted further for the module 12, particularly at its central portion. This provides end sections 52 and 53 having a slightly shorter radius of curvature than that of the end sections 41 and 42 of the module 11. The central portion is drawn inwardly sufficiently to produce exteriorly concave side portions 54 and 55. When so distorted the module 12 can be positioned within the module 11 on the frame 46. Suitable spacers 57 are interposed between the modules 11 and 12 at their end portions, after which the cable assemblies 34, 35 and 36 of the module 12 are removed. The module 12 retains its distorted configuration, being prevented from expansion by reason of the spacers 57 bearing against the module 11, which in turn is retained by the frame 46.

The final module 13 is distorted even further than the module 12 in order that it may fit within the latter module. Thus, its end portions 58 and 59 have a sharper curvature than that of the end portions 52 and 53 of the module 12. Also, the exteriorly concave sidewalls 60 and 61 of the module 13 are given a greater curvature than the corresponding parts of the module 12, being brought together a sufficient distance to provide a clearance between the module 13 and the module 12. With the module 13 positioned within the module 12, spacers 62 are provided between those two modules and the cable assemblies 34, 35 and 36 are released and removed. The module 13 is held in its distorted configuration by the spacers 62 reacting through the module 12, the spacers 57 and the module 11 so as to be confined by the U-shaped elements 47 of frame 46.

Irrespective of the varying degrees of distortion, each module is a member only within its elastic limit.

The central space within the nested modules may be utilized to hold the top 14 and base 15 of the tank, enabling the entire tank assembly to be shipped as one unit. The top and base are cut into two sections so that they will fit within the nested modules and not project upwardly too far to interfere with shipment. The severing of the top and bases along a diameter is indicated in FIG. 9. The flat edge of each cut section then can be positioned at the bottom of the frame 46, resting along the horizontal beams 49.

To assure that the U-shaped retention portions 47 do not spring outwardly as the distorted tank is transported, cables 63, 64 and 65 may be extended between the vertical portions 48 of the sections 47 of the frame and tightened. Openings may be formed in the sections of the top 14 and base 15 to enable the central cable 64 to fit between the elements 48, as best seen in FIG. 9. With the frame 46 and the nested tank assembly loaded on a trailer bed 67, as shown in FIG. 9, the tank is ready for transportation to the job site. Eyebolts 68 at the tops of the vertical sections 48 are used in lifting the frame 46 onto the truck bed, as well as providing the means for the attachment of the cable assemblies 63, 64 and 65.

When the site for the erection of the tank 10 is reached, the cable assemblies 34, 35 and 36 are attached to the eyebolts 32 of the inside module 13 and tightened slightly to contract the module 13 and allow its removal from the nested modules. The eyebolts 29 of the module 13 are used in lifting it out of the nested assembly. The cable assemblies 34, 35 and 36 are loosened and released from the module 13 so that it is no longer under constraint. The module 12 then is removed from the module 11 in a similar manner and the constraint upon it is removed. Finally, the module 11 is contracted and removed from the frame 46 and the constraining force upon it then released. When the modules 11, 12 and 13 are freed in this manner they recover their original shape because of their resilience, so that they again become cylindrical just as if they never had been distorted.

The tank 10 is assembled by first joining the top 14 and the upper module 11, and then working progressively toward the base 15. This permits most of the work to be done at ground level, reducing costs and the hazards of work at higher levels. Initially, the top module 11 is placed upon a previously-prepared flat pad 70 of concrete which is to provide the support for the tank, the module axis being vertical. The channels 23 then are removed from the module 11 by grinding off the impregnated glass cloth 27 that covered the tabs 26 of the channel. Also, the eyebolts 32 are removed and the edge of the corrosion barrier 20 on the inner tank surface is trimmed off, as needed, so that it is spaced a predetermined distance from the top edge 71 of the module. Guide members 72 and 73 then are secured by bolts 74 to the opposite sides of the upper end of the module 11. The guide members 72 and 73 include angular upper portions 75 and 76 each of which extends outwardly at an obtuse angle just above the upper edge 71 of the module 11. The top 14 of the tank is reassembled into a single piece and provided with lugs 77 that enable it to be lifted by a hoist 78 and moved over the module 11, as indicated in FIG. 11. The top 14 then is lowered downwardly so that the bottom edge 79 of its side flange 80 rests upon the upper edge 71 of the module 11. The angular portions 75 and 76 of the guide members 72 and 73 help direct the flange 80 so that it is aligned precisely with the wall of the module 11.

After the top 14 has been positioned on the module 11, the guide members 72 and 73 are removed and the joint is secured and sealed. On the outside this is accomplished by extending three layers 81, 82 and 83 of impregnated fiber glass strips around the perimeter of the tank overlapping the joint area. On the inside there are two reinforced layers 84 and 85 extended around the periphery of the tank at the joint similarly to the outside. Over this is placed a layer 86 of the corrosion barrier material which extends to and merges with the corrosion barrier 20 of the module 11 and the corrosion barrier 87 of the top 14.

The module 11 assembled with the top 14 then is removed from the pad 70 and the center module 12 is placed on the pad, as shown in FIG. 12. The channels 23 are removed from the module 12 and guide members 72 and 73 are attached to its top. After this, the module 11 is lowered onto the module 12 so that the bottom edge of the module 11 abuts the top edge of the module 12. After directing the modules 11 and 12 into their end-to-end abutting relationship, the guide members 72 and 73 are removed as before and the joint is secured and sealed as described above for the joint between the module 11 and the top 14.

Markings 88 may be provided on the modules at the time of their construction at a predetermined angular position on each of the modules. These markings 88 are aligned when the modules are assembled so that the modules have a predetermined relative angular relationship. This is of importance when the modules are provided with manways, nozzles or other items (not shown) which are to assume specific relative positions in the completed tank.

Following this, the sections of the bottom 15 are attached together and placed upon the pad 70, with the guide members 72 and 73 secured to the flange 89 of the bottom section. The module 13, suspended by the eyebolts 29, is lowered onto the flange 89 and, upon removal of the guide members 72, and 73, as well as the channels 23, the joint is secured and sealed.

The final assembly step is shown in FIG. 14, with the assembly of the modules 11 and 12 and the top 14 lowered onto the upper edge of the bottom module 13. Again, the guide members 72 and 73 help align the components as the butt joint is formed. After the bottom edge of the module 12 engages the upper edge of the module 13, the joint between these two modules is secured and sealed in the manner described above. This completes the tank assembly except for the removal of the lugs 77, the patching of any remaining openings and the addition of whatever accessories and appurtenances are desired.

The tank may be constructed of various numbers of modules depending upon its size and transportation restrictions. Similarly, the number of cable assemblies used to draw the module walls inwardly can be changed for the tanks of different diameters. In a like manner, the top and bottom portions of the tank may be cut into a greater number of sections for shipment or left in one piece of a size such that shipment is practical. The oblating of the cylindrical part of the tank will allow the advantages of factory manufacture and on-site erection to be realized even where the tank is of such a height that only a single cylindrical section is needed.

The foregoing detailed description is to be clearly understood as given by way of illustration and example only, the spirit and scope of this invention being limited solely by the appended claims.

I claim:

1. The method of producing a tank at a predetermined location comprising the steps of forming at a second location remote from said predetermined location member of resilient material so as to have a substantially cylindrical configuration, deforming said member to a noncylindrical shape so as to reduce the transverse dimension thereof in one direction while remaining within the elastic limit of said member, holding said member in said shape, transporting said member while so held from said second location to said predetermined location, releasing said member at said predetermined location and allowing the same to resume said substantially cylindrical configuration, and attaching end means to said member when so released for completing a tank.

2. The method as recited in claim 1 in which said member is made to have a plurality of sections each of which is so deformed to a noncylindrical shape, held, transported and released, and including in addition the step of attaching together said sections of said member at said predetermined location.

3. The method as recited in claim 2 in which for said attaching together of said sections, said sections are placed in an end-to-end relationship, and a connection is made between the ends of said sections so placed.

4. The method as recited in claim 3 in which said material is a fiber glass reinforced resin, and for said connection resin impregnated strips are extended around the periphery of said sections so as to overlap said ends of said sections so abutted.

5. The method as recited in claim 3 in which there are at least two of said sections, and in which for said abutting of said sections, one of said sections is placed on a supporting surface with its axis substantially vertical and the other of said sections is positioned above said one section and then lowered onto said one section so that the lower end of said other section abuts the upper end of said one section.

6. The method as recited in claim 5 in which for said aligning of said sections guide means are attached to the upper end of said one section for engagement by said other section during said lowering of said other section onto said one section for aligning said sections in said end-to-end relationship.

7. The method as recited in claim 6 in which for said guide means a plurality of guide elements are attached to said upper end of said one section, each of said guide elements being formed with portions diverging upwardly from said upper end for receiving said lower end of said other section.

8. The method as recited in claim 2 in which each of at least two of said sections is provided with an indicia thereon at a predetermined angular position, and in which said indicia are aligned before said attaching of said two sections for causing said sections to assume a predetermined relative angular relationship.

9. The method as recited in claim 1 in which said material is made of a fiber glass reinforced plastic substantially completely cured prior to said deforming thereof.

10. The method as recited in claim 1 in which said material is made of a fiber glass reinforced polyester resin substantially completely cured prior to said deforming thereof.

11. The method as recited in claim 2 in which said forming of each of said sections includes the winding of a filament upon a drum, and impregnating said filament with a plastic material upon such winding so that said material is a fiber glass reinforced plastic.

12. The method as recited in claim 2 in which there are at least three of said sections, and each of said sections is made approximately eight feet in length.

13. The method as recited in claim 1 in which said member is positioned at said predetermined location with its axis substantially vertical, and said end means includes a top and a bottom for said member which are attached to opposite ends thereof.

14. The method as recited in claim 2 in which said member is made to have at least two of said sections, one of said sections is so deformed to a greater degree than the other of said sections, and said one section is positioned within said other section during said transporting of said member to said predetermined location.

15. The method as recited in claim 14 in which said one section is so held during said transporting of the same by engaging the exterior thereof, and in which said other section is so held during said transporting thereof by said one section.

16. The method as recited in claim 1 in which said end means is formed at said second location, and in which said end means is positioned interiorly of said member when said member is so transported to said predetermined location.

17. The method as recited in claim 16 in which said end means is cut in segments at said second location, said segments being so positioned interiorly of said member, and said segments are reattached upon said transporting of the same to said predetermined location.

18. The method as recited in claim 2 in which said member is made to have three of said sections, the first of said sections is so deformed to a relatively small lateral dimension, the second of said sections is so deformed to an intermediate lateral dimension, the third of said sections is so deformed to a relatively large lateral dimension, and during said transporting said first section is positioned within said second section and said second section is positioned within said third section.

19. The method as recited in claim 18 in which for said holding of said member a frame is prepared and engaged with the exterior of said third section for exteriorly restraining said third section, spacer means are interposed between said third section and said second section so as to maintain said second and third sections spaced apart and exteriorly restrain said second section, and spacer means are interposed between said second section and said first section so as to maintain said first and second sections spaced apart and exteriorly restrain said first section.

20. The method as recited in claim 19 in which said third section is so deformed so as to have rounded opposite ends interconnected by opposed substantially straight wall portions, and said first and second sections are so deformed so as to have rounded ends interconnected by opposed exteriorly concave wall portions.

21. The method as recited in claim 20 in which said opposed exteriorly concave wall portions of said first section are given a greater curvature than that of said opposed exteriorly concave wall portions of said second section.

22. The method as recited in claim 1 in which said member is so deformed by attaching at least one tension element member so as to extend across the interior thereof, and pulling on said tension element so as to deform said member.

23. The method as recited in claim 1 in which for said deforming of said member the same is pulled from within, and for said holding of said member the same is restrained exteriorly.

24. The method as recited in claim 23 in which for said holding of said member a frame is prepared having a plurality of opposed spaced abutments, said member upon said deforming thereof is so pulled from within to a transverse dimension less than the spacing between said spaced abutments, then said member is placed between said spaced abutments, and then said member is released from said pull from within so that said spaced abutments engage the exterior of said member for so restraining said member exteriorly.

25. The method as recited in claim 24 in which for said releasing of said member the same is pulled from within so as to give said member a transverse dimension less than said spacing between said spaced abutments, then said member is removed from said frame, and then said pull from within is relaxed so that said member can so resume said substantially cylindrical configuration.

26. The method as recited in claim 1 including the steps of attaching a plurality of structural elements to said member at spaced locations prior to said deforming thereof, and exerting a force on said structural elements for accomplishing said deforming of said member.

27. The method as recited in claim 26 in which for said exerting of a force on said structural elements, cable means are extended between spaced ones of said structural elements and said cable means are shortened to exert said force.

28. The method as recited in claim 27 in which said cable means and said structural elements are arranged to provide a first cable means extending between diametrically opposed ones of said structural elements, and two additional cable means positioned one on either side of said first cable means, said two additional cable means being oriented so as to be substantially parallel to said first cable means and chordal with respect to said member prior to said deformation of said member.

29. The method as recited in claim 27 in which attaching means are extended from said structural elements through said member to the interior of said member, and in which said cable means are connected to said attaching means for so being extended between spaced ones of said structural elements.

30. The method as recited in claim 26 in which for said structural elements beams are attached to the exterior of said member so as to be substantially parallel to the axis of said member, said force being exerted on said beams substantially at the ends of said member.

31. The method as recited in claim 30 in which said material is a reinforced plastic, and for said attaching of said beams laterally projecting tabs are attached to beams, said tabs are positioned over the exterior surface of said member, and plastic impregnated cloth is positioned over said tabs overlapping said exterior surface and attached thereto for thereby securing said tabs to said exterior surface.

32. The method as recited in claim 2 in which said end means includes a tank top, said attaching of said end means includes the securing of said top end of a first of said sections, and said attaching together of said sections includes positioning a second of said sections on a supporting surface so that its axis is substantially vertical, lifting said first section and said top so attached thereto onto said second section so that the opposite end of said first section is adjacent the upper end of said second section, and then securing said opposite end of said first section to said upper end of said second section.

33. The method as recited in claim 1 in which said end means includes a tank bottom, and for said attaching of said end means said tank bottom is placed on a supporting surface, said member is lifted and lowered onto said tank bottom so positioned, and then the lower end of said member is secured to said tank bottom.

34. The method as recited in claim 1 in which said end means includes a tank top, and for said attaching of said end means said member is positioned on a supporting surface with its axis substantially vertical, said top is lifted and lowered onto the upper end of said member so positioned and then said top is secured to said upper end of said member.

35. The method of producing a tank at a predetermined location comprising the steps of
  forming at a second location remote from said predetermined location three members of a resilient material so as to have a substantially cylindrical configuration,
  said member being given the same radius of curvature,
  deforming said members so that each is given a noncylindrical shape and a reduced transverse dimension in one direction while remaining within the elastic limit of each of said members,
  holding said members in said shape, transporting said members while so held from said second location to said predetermined location,
  releasing said members at said predetermined location and allowing the same to resume said substantially cylindrical configuration,
  positioning a first of said members so released on a supporting surface with the axis thereof substantially vertical,
  attaching a tank top to the upper end of said first member so positioned,
  positioning a second of said members so released on a supporting surface with its axis substantially vertical,
  lifting said first member and said top so attached thereto and lowering the same onto said second member so positioned so that the lower end of said first member is adjacent the upper end of said second member so positioned, and then attaching said lower end of said first member to said upper end of said second member,
  positioning a tank bottom on a supporting surface, lifting the third of said members so released and lowering the same onto said tank bottom so that the axis of said third member is substantially vertical and the lower end of said third member is adjacent said tank bottom, and then attaching said lower end of said third member to said tank bottom, and then lifting said top, first member and second member so attached and lowering the same onto said third member so that the lower end of said second member is adjacent the upper end of said third member, and then attaching said lower end of said second member to said upper end of said third member.

* * * * *

UNITED STATES PATENT OFFICE
CERTIFICATE OF CORRECTION

PATENT NO. : 3,956,816
DATED : May 18, 1976
INVENTOR(S) : Robert J. Short

It is certified that error appears in the above-identified patent and that said Letters Patent are hereby corrected as shown below:

Column 3, line 37, delete "that" and insert --- than ---; and

Column 7, line 16, after "location" insert --- a ---.

Signed and Sealed this

Tenth Day of August 1976

[SEAL]

Attest:

RUTH C. MASON
Attesting Officer

C. MARSHALL DANN
Commissioner of Patents and Trademarks